(12) United States Patent
Lazar et al.

(10) Patent No.: US 8,648,561 B2
(45) Date of Patent: Feb. 11, 2014

(54) METHOD FOR DRIVING A PULSE WIDTH MODULATED CONTROLLER

(75) Inventors: Radu Dan Lazar, Soenderborg (DK); Henrik Rosendal Andersen, Graasten (DK)

(73) Assignee: Danfoss Drives A/S, Graasten (DK)

( * ) Notice: Subject to any disclaimer, the term of this patent is extended or adjusted under 35 U.S.C. 154(b) by 1003 days.

(21) Appl. No.: 12/593,063

(22) PCT Filed: Mar. 26, 2008

(86) PCT No.: PCT/DK2008/000117
§ 371 (c)(1),
(2), (4) Date: Mar. 15, 2010

(87) PCT Pub. No.: WO2008/116467
PCT Pub. Date: Oct. 2, 2008

(65) Prior Publication Data
US 2010/0270964 A1    Oct. 28, 2010

(30) Foreign Application Priority Data

Mar. 27, 2007   (DK) ................................ 2007 00473

(51) Int. Cl.
*G05B 11/28*   (2006.01)
(52) U.S. Cl.
USPC ....................................................... 318/599
(58) Field of Classification Search
None
See application file for complete search history.

(56) References Cited

U.S. PATENT DOCUMENTS 4,488,103 A    12/1984 Morinaga et al.
4,656,572 A    4/1987 Caputo et al.
(Continued)

FOREIGN PATENT DOCUMENTS

| DE | 33 03 904 C1 | 9/1984 |
| EP | 0 533 403 A2 | 3/1993 |
| EP | 0 822 648 A1 | 2/1998 |
| JP | 2002 325459 A | 11/2002 |

OTHER PUBLICATIONS

Texas Instruments Europe, "Three phase current measurements using a single line resistor on the TMS320F240", Literature No. BPRA077, May 1998 pp. 1-72.

(Continued)

*Primary Examiner* — Lincoln Donovan
*Assistant Examiner* — Zoheb Imtiaz
(74) *Attorney, Agent, or Firm* — McCormick, Paulding & Huber LLP

(57) ABSTRACT

The present invention relates to a method for generating an electric control signal for controlling one or more switching elements of an inverter for driving an electric machine, such as a motor, the method comprising the steps of providing an electric control signal comprising a control frequency and a corresponding control period, dividing a first control period of said electric control signal into a plurality of switching periods, and providing a first switching PWM pulse within a first switching period of a first control period, and providing a second switching PWM pulse within a second switching period of said first control period, wherein the first switching PWM pulse is a minimum-filtered PWM pulse, and wherein the second switching PWM pulse is a corrected PWM pulse. The present invention further relates to an electronic control signal provided according to the before-mentioned method, and to an electronic control system for providing the before-mentioned method.

19 Claims, 11 Drawing Sheets

(56) References Cited

U.S. PATENT DOCUMENTS

| | | | |
|---|---|---|---|
| 4,870,556 | A | 9/1989 | Inaba et al. |
| 5,023,538 | A | 6/1991 | Mutoh et al. |
| 5,309,349 | A | 5/1994 | Kwan |
| 5,436,545 | A | 7/1995 | Bahr et al. |
| 5,623,192 | A | 4/1997 | Yamamoto |
| 5,734,250 | A | 3/1998 | Lindmark |
| 5,969,958 | A | 10/1999 | Nielsen et al. |
| 6,049,474 | A | 4/2000 | Platnic |
| 6,535,402 | B1 | 3/2003 | Ying et al. |
| 6,735,537 | B2 | 5/2004 | Liu et al. |
| 2001/0015904 | A1 | 8/2001 | Kimura et al. |
| 2005/0057200 | A1* | 3/2005 | Akiyama .................. 318/66 |
| 2006/0062033 | A1 | 3/2006 | Kimata et al. |
| 2007/0001633 | A1 | 1/2007 | Su et al. |
| 2008/0116841 | A1* | 5/2008 | Masamoto et al. ........... 318/801 |

OTHER PUBLICATIONS

Search Report for U.S. Appl. No. PCT/DK2008/000117 dated Feb. 17, 2009.

P.Thogersen and J.K. Pedersen's "Stator Flux Oriented Asynchronous Vector Modulation for AC-Drives", Power Electronics Specialists Conference (PESC), Jun. 11-14, 1990 (Digital Object Identifier 10.1109/PESC.1990.131249).

* cited by examiner

METHOD FOR DRIVING A PULSE WIDTH MODULATED CONTROLLER

CROSS REFERENCE TO RELATED APPLICATIONS

This application is entitled to the benefit of and incorporates by reference essential subject matter disclosed in International Patent Application No. PCT/DK2008/000117 filed on Mar. 26, 2008 and Danish Patent Application No. PA 2007 00473 filed Mar. 27, 2007.

FIELD OF THE INVENTION

The present invention relates to a method and a control system for generating an electric control signal for controlling one or more switching elements of an inverter for driving an electric machine, such as an AC-motor or a DC-motor. According to the present invention a minimum-filtered PWM pulse and a corrected PWM pulse are provided within the same control period.

BACKGROUND OF THE INVENTION

Most motor controllers on the market are of the pulse-width-modulated (PWM) type. This goes for products from Danfoss Drives NS, such as the VLT® 5000, the VLT® 2800, the VLT® AutomationDrive FC 30× and the VLT® Micro Drive FC 51. Products like these generate a set of 3-phase PWM voltages displaced 120° in time, with a variable amplitude and frequency, for feeding variable-speed AC-motors with balanced, 3-phase sinusoidal phase currents. The phase currents contain a fundamental component delivering the shaft power to the motor, and some undesirable ripple currents or high-frequency harmonics present at the switching frequency and at higher frequencies.

Typically, the switching frequency should be 10 to 100 times higher than the fundamental motor frequency to get a satisfactory resolution. The ripple currents originate from the PWM voltages emulating a 3-phase sinusoidal voltage system in average over a fundamental period of the motor. The fundamentals of how to generate these voltages are well-known. An original reference on this topic is the paper "Stator Flux Oriented Asynchronous Vector Modulation for AC-Drives" by P. Thøgersen and J. K. Pedersen presented at the Power Electronics Specialists Conference (PESC), 11-14 Jun. 1990 (Digital Object Identifier 10.1109/PESC.1990.131249). Employing the principles in this paper, the idea is to let a processing unit, such as a DSP, a micro controller or an ASIC generate 6 PWM signals controlling the typical 6 switching elements (T1 to T6) in the inverter part of the motor controller. Each of the 3 phase legs of the inverter part consists of a pair of series coupled switching elements, which can either be on or off. The switching elements are never on at the same time, meaning that the PWM signal for the low-side switching element is in anti-phase with the PWM signal for the high-side switching element always. Hence, the processing unit basically has to generate 3 PWM signals only, because the generation of the 3 others is trivial. Typically, the low-side PWM signals are generated by inverting the high-side PWM signals.

The most frequent implementation of a PWM modulation strategy in a processing unit is to update all PWM signals at the switching-period rate. This means that each duty cycle varies from one switching period to the next, with the object of emulating the sinusoidal fundamental component. Here, the duty cycle of a switching element equals the on-time of said switching element within a switching period divided by the switching period.

This gives a heavy load on the processing unit, especially if the switching frequency is altered from a usual value, such as 2-5 kHz, to a high value of more than 10 kHz. A switching frequency of 16 kHz is a typical setting for motor controllers in applications where minimization of the well-known, high-frequency acoustic-noise emission from the motor originating from the PWM voltages (ripple components) is important. Some processing units are able to handle the load at the expense of increased costs.

If a low-cost processing unit is used, a known way to deal with the calculation burden is to keep all the complex sinusoidal PWM calculations given in the above PESC'90 paper at a low rate, such as 4 kHz. Hence, this gives a set of PWM signals with a frequency of 4 kHz and accompanying optimized duty cycles. Now, if each duty cycle is simply divided by 4, and reused over 4 switching cycles in a row having a switching frequency of 16 kHz, then a lot of calculation power is saved. This "reuse method" is of course not as good as doing the sinusoidal calculations at the 16 kHz rate in terms of having minimum current ripples in the motor etc., but to suppress acoustic-noise emission it is an adequate solution. When applying the "reuse method" one can define the calculations as being executed at a control frequency level, but the actual PWM voltages are executed at a switching frequency level, which is always higher than the control frequency level.

Returning to the art of PWM modulation a known problem is that, if the duty cycle of a PWM signal goes either too small (close to zero) or too close to the boundaries of the PWM period (close to unity), then the corresponding switching element is either turned off and turned on again, or turned on and turned off again, within a very short time period. This is not an acceptable operation mode of a physical switching element, such as an IGBT or MOSFET transistor. To avoid these borderline effects, a known method is to implement a minimum pulse filter in the PWM calculations. The procedure is as follows. If a duty cycle goes too small, then said duty cycle is not used. Instead the duty cycle is set to zero ("it is being filtered") and an error is calculated. This error is added to the duty cycle in the next PWM period ("it is being corrected"). Hence, the correct voltage×second product is maintained as seen from a fundamental-period perspective. Likewise, if the duty cycle goes too large, then said duty cycle is not used. Instead the duty cycle is set to unity ("it is being filtered"), and the introduced error is subtracted from the duty cycle calculated in the next PWM period ("it is being corrected").

Now, if this standard minimum-pulse-filtering method is used in connection with the "reuse method" described above, a problem occurs in that the filtering and correction will then be executed at a 4 kHz rate. Such filtering/correction can undoubtedly be observed by the human ear as acoustical noise from the motor. In addition, a 4 kHz distortion of the phase currents is observed due to the fact that, the minimum-pulse-filter time becomes relatively large, as the switching frequency is raised. If the switching frequency is 16 kHz and the minimum-pulse-filter time is 3 µs, then the relative impact is 100×3 µs×16 kHz=5%.

It may be seen as an object of the present invention to provide a low-cost method and corresponding system for providing an electric control PWM signal for controlling one more switching elements of an inverter for driving an electric machine, such as an AC-motor or a DC-motor.

SUMMARY OF THE INVENTION

The above-mentioned object is complied with by providing, in a first aspect, an electric control signal for controlling one or more switching elements of an inverter for driving an electric machine, wherein the electric control signal comprises a control frequency and a corresponding first control period being divided into a plurality of switching periods, wherein a first switching PWM pulse is provided within a first switching period of a first control period, and wherein a second switching PWM pulse is provided within a second switching period of said first control period, wherein the first switching PWM pulse is a minimum-filtered PWM pulse, and wherein the second switching PWM pulse is a corrected PWM pulse. Preferably, the electric machine is a motor, such as an AC-motor or a DC-motor.

The second switching period may immediately follow the first switching period, or alternatively, the first switching period may immediately follow the second switching period. Thus, the corrected PWM pulse may follow the minimum-filtered PWM pulse, or alternatively, the minimum-filtered PWM pulse may follow the corrected PWM pulse. A duty cycle of the first switching PWM pulse may be different from a duty cycle of the second switching PWM pulse. Thus, the duty cycle of the minimum-filtered PWM pulse may be different from a duty cycle of the corrected PWM pulse.

The electric control signal according to the first aspect of the present invention may further comprise a third switching PWM pulse within a third switching period of said first control period. The third switching PWM pulse may be a minimum-filtered PWM pulse having a duty cycle essentially equal to the duty cycle of the first switching PWM pulse, or it may be a corrected PWM pulse having a duty cycle essentially equal to the duty cycle of the second switching PWM pulse.

The third switching period may immediately follow the second switching period, or it may immediately follow the first switching period, in case the first switching period follows the second switching period.

The electric control signal according to the first aspect of the present invention may further comprise a fourth switching PWM pulse within a fourth switching period of said first control period. The fourth switching PWM pulse may be a minimum-filtered PWM pulse having a duty cycle essentially equal to the duty cycle of the first switching PWM pulse, or it may be a corrected PWM pulse having a duty cycle essentially equal to the duty cycle of the second switching PWM pulse. The fourth switching period may immediately follow the third switching period.

The electric control signal according to the first aspect of the present invention may further comprise one or more additional switching PWM pulses provided within respective ones of one or more additional switching periods of said first control period. Thus, the number of switching periods within the first control period may be chosen arbitrarily.

The electric control signal according to the first aspect of the present invention may further comprise one or more subsequent control periods each being divided into a plurality of switching periods, wherein a switching PWM pulse is provided within a switching period of a subsequent control period, and wherein said switching PWM pulse is a corrected PWM pulse provided for correction of at least part of an error not corrected for in the first control period. Thus, the provided corrected PWM pulse may be provided in any of the plurality of switching periods of a subsequent control period. The subsequent control period may immediately follow the first control period. Alternatively, other subsequent control periods may be between the first control period and the subsequent control period within which, the corrected PWM pulse is provided.

The frequency of the first control period and the first subsequent control period may be within the range 1-10 kHz, such as within the range 2-8 kHz, such as within the range 3-6 kHz, such as approximately 4 kHz. In case the control frequency is 4 kHz, and in case each control period is divided into four switching periods, the switching frequency equals 16 kHz. However, both the control frequency and the number of switching periods within the control periods may differ from the above-mentioned values.

In a second aspect, the present invention relates to a method for generating an electric control signal for controlling one or more switching elements of an inverter for driving an electric machine, the method comprising the steps of
  providing an electric control signal comprising a control frequency and a corresponding control period,
  dividing a first control period of said electric control signal into a plurality of switching periods, and
  providing a first switching PWM pulse within a first switching period of a first control period, and providing a second switching PWM pulse within a second switching period of said first control period, wherein the first switching PWM pulse is a minimum-filtered PWM pulse, and wherein the second switching PWM pulse is a corrected PWM pulse.

Again, the second switching period may immediately follow the first switching period, or alternatively, the first switching period may immediately follow the second switching period. Thus, the corrected PWM pulse may follow the minimum-filtered PWM pulse, or alternatively, the minimum-filtered PWM pulse may follow the corrected PWM pulse. A duty cycle of the first switching PWM pulse may be different from a duty cycle of the second switching PWM pulse. Thus, the duty cycle of the minimum-filtered PWM pulse may be different from a duty cycle of the corrected PWM pulse.

The method according to the second aspect of the present invention may further comprise a step of providing a third switching PWM pulse within a third switching period of said first control period. The third switching PWM pulse may be a minimum-filtered PWM pulse having a duty cycle essentially equal to the duty cycle of the first switching PWM pulse, or it may be a corrected PWM pulse having a duty cycle essentially equal to the duty cycle of the second switching PWM pulse.

The third switching period may immediately follow the second switching period, or it may immediately follow the first switching period in case the first switching period follows the second switching period.

The method according to the second aspect of the present invention may further comprise a step of providing a fourth switching PWM pulse within a fourth switching period of said first control period. The fourth switching PWM pulse may be a minimum-filtered PWM pulse having a duty cycle essentially equal to the duty cycle of the first switching PWM pulse, or it may be a corrected PWM pulse having a duty cycle essentially equal to the duty cycle of the second switching PWM pulse. The fourth switching period may immediately follow the third switching period.

According to the method of the present invention, one or more additional switching PWM pulses may be provided within respective ones of one or more additional switching periods of said first control period. Thus, the number of switching periods within the first control period may be arbitrarily.

The method according to the second aspect of the present invention may further comprise a step of providing a switching PWM pulse within a switching period of a subsequent control period to the first control period, wherein said switching PWM pulse is a corrected PWM pulse provided for correction of at least part of an error not corrected for during the first control period. The subsequent control period may immediately follow the first control period. Alternatively, other subsequent control periods may be provided between the first control period and the subsequent control period, within which the corrected PWM pulse is provided.

The frequency of the first control period and the first subsequent control period may be within the range 1-10 kHz, such as within the range 2-8 kHz, such as within the range 3-6 kHz, such as approximately 4 kHz.

The provided minimum-filtered PWM pulse may be generated in response to a comparison between a desired PWM pulse and a predetermined percentage of the duration of the first switching period.

The method may further comprise the step of setting the duty cycle of the minimum-filtered PWM pulse to a predetermined maximum value, in case the duration of the desired PWM pulse exceeds the predetermined percentage of the duration of the first switching period, said predetermined maximum value being equal to unity.

Alternatively, the method comprise the step of setting the duty cycle of the minimum-filtered PWM pulse to a predetermined minimum value, in case the duration of the desired PWM pulse is smaller than the predetermined percentage of the duration of the first switching period, said predetermined minimum value being equal to zero.

Thus, the duty cycle may be set to unity in case the desired pulse exceeds Tsw−MinPulse, where Tsw is the switching period and MinPulse represents the predetermined percentage. In case the switching period is around 62.5 μs, MinPulse may be in the range 1-5 μs. In case the desired pulse width exceeds Tsw−2×MinPulse, but is smaller than Tsw−MinPulse, the filtered width of the pulse is set to Tsw−2×MinPulse. In case the desired pulse width is smaller than MinPulse, the duty cycle may be set to zero, whereas in case the desired pulse width exceeds MinPulse, but is smaller than 2×MinPulse, the filtered width is set to 2×MinPulse.

In a third aspect, the present invention relates to a system for generating an electric control signal for controlling one or more switching elements of an inverter for driving an electric machine, the system comprising means for providing an electric control signal comprising a control frequency and a corresponding control period, means for dividing a first control period of said electric control signal into a plurality of switching periods, and means for providing a first switching PWM pulse within a first switching period of said first control period, and means for providing a second switching PWM pulse within a second switching period of said first control period, wherein the first switching PWM pulse is a minimum-filtered PWM pulse, and wherein the second switching PWM pulse is a corrected PWM pulse.

According to this aspect of the present invention a first buffer may be adapted to provide the minimum-filtered PWM pulse, and a second buffer may be adapted to provide the corrected PWM pulse.

In a fourth aspect, the present invention relates to an inverter for driving an electric machine, the inverter comprising one or more controllable switching elements, each of said one or more controllable switching elements being controllable by an electric control signal, means for providing the electric control signal, said electric control signal comprising a control frequency and a corresponding control period, means for dividing a first control period of said electric control signal into a plurality of switching periods, and means for providing a first switching PWM pulse within a first switching period of said first control period, and means for providing a second switching PWM pulse within a second switching period of said first control period, wherein the first switching PWM pulse is a minimum-filtered PWM pulse, and wherein the second switching PWM pulse is a corrected PWM pulse.

BRIEF DESCRIPTION OF THE DRAWINGS

The present invention will now be explained in further details with reference to the accompanying figures, wherein.

DETAILED DESCRIPTION OF THE PREFERRED EMBODIMENTS

In its broadest aspect the present invention relates to a method for generating an electric control signal for controlling one or more switching elements of an inverter for driving an electric machine, said electric machine preferably being a motor. In the following, the before-mentioned electric machine will be referred to as being a motor. The method comprises the steps of providing an electric control signal comprising a control frequency and a corresponding control period. The control frequency may in principle be arbitrary, but typically the control frequency will be around 4 kHz with a corresponding control period of 250 μs. The control period is then divided into a plurality of switching periods. The number of switching periods can be even or odd depending on the specific application. In case, each control period of a 4 kHz control signal is divided into four switching periods, each switching period will have a duration of 62.5 μs. A minimum-filtered PWM pulse is then provided within a first switching period. For at least partly correcting for a modified duty cycle in connection with the provided minimum-filtered PWM pulse, a corrected PWM pulse is provided within a second switching period, the second switching period belonging to the same control period as the first switching period. The second switching period, within which the corrected PWM pulse is provided, may not necessarily immediately follow the first switching period.

The above-mentioned method will provide an electric control signal for controlling one or more switching elements of an inverter, the electric control signal comprising a control frequency and a corresponding first control period being divided into a plurality of switching periods, wherein a first switching PWM pulse is provided within a first switching period of a first control period, and wherein a second switching PWM pulse is provided within a second switching period of said first control period, wherein the first switching PWM pulse is a minimum-filtered PWM pulse, and wherein the second switching PWM pulse is a corrected PWM pulse.

The present invention will now be explained in further technical details with reference to the accompanying FIGS. 1-11.

Figure 1:
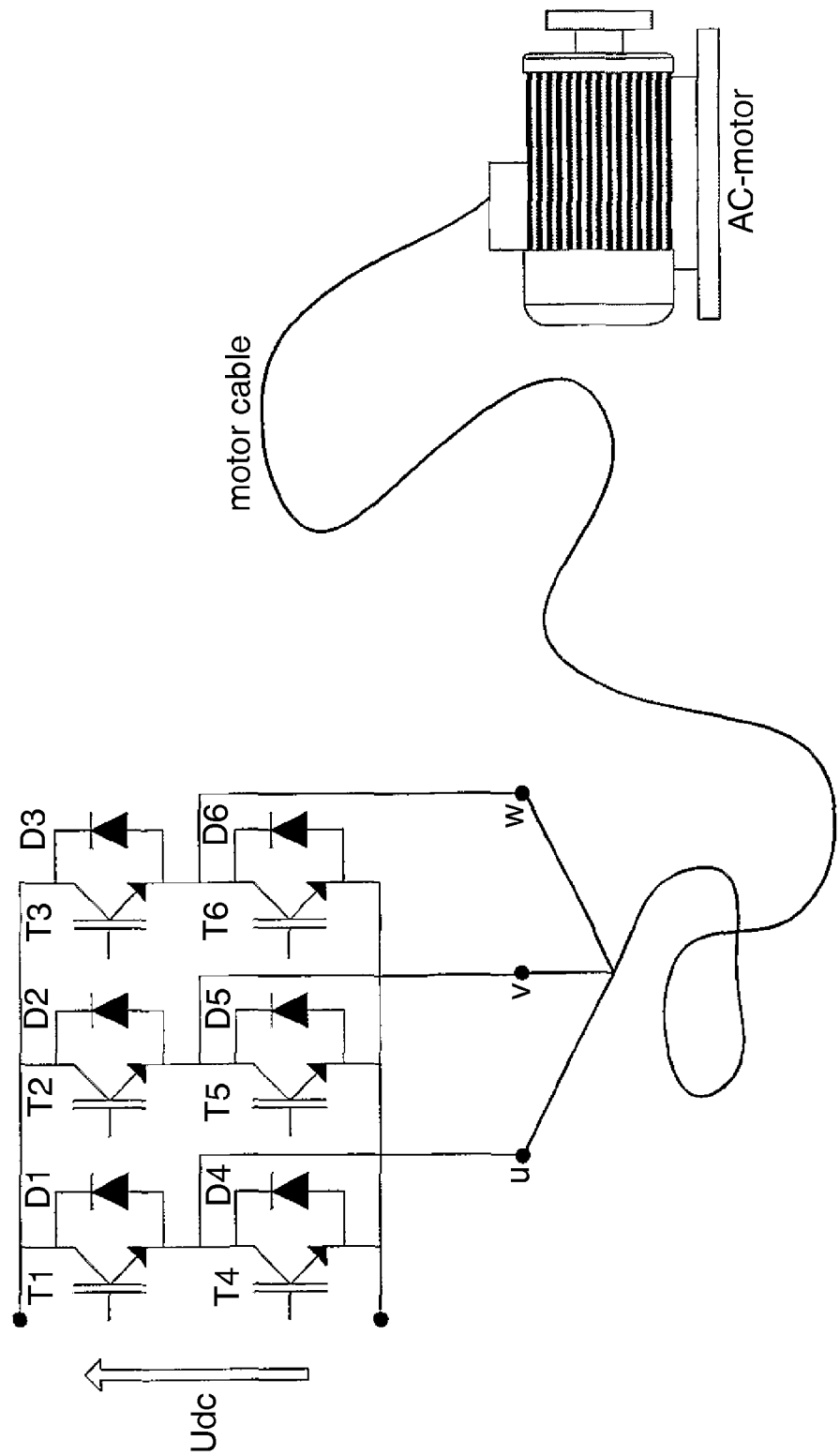
FIG. 1 shows a typical three-phase motor controller connected to an AC motor.

Referring now to FIG. 1 a three-phase inverter operatively connected to a three-phase AC-motor via a motor cable is depicted. As depicted, the inverter comprises six switching elements (T1-T6) and six corresponding free-wheeling diodes (D1-D6). Each switching element can for example be an IGBT or a MOSFET transistor. Switching elements T1 and T4 generate phase u, switching elements T2 and T5 generate phase v, whereas switching elements T3 and T6 generate phase w. The input signal to the three-phase inverter of FIG. 1 is a DC voltage, Udc.

Figure 2:
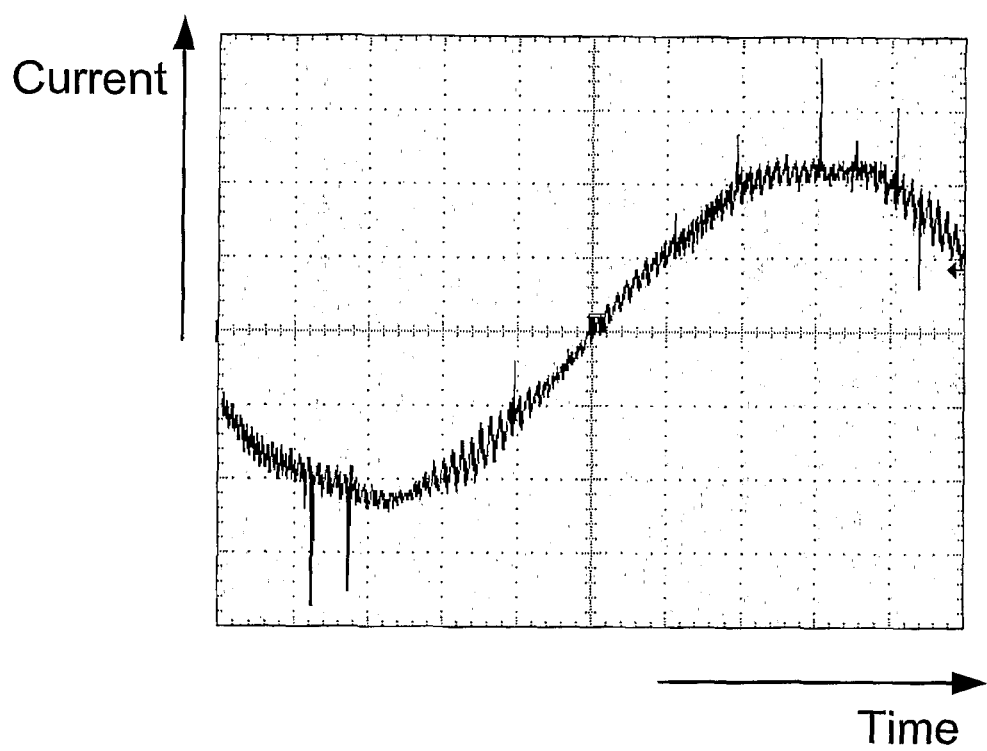
FIG. 2 shows a typical measured AC-motor current.

FIG. 2 shows a typical motor current provided from an inverter as depicted in FIG. 1. As maybe deduced from FIG. 2, the motor current contains a fundamental component, which delivers the useful power to the motor—here an AC-motor. The frequency of the fundamental component depicted in FIG. 2 is around 50 Hz. The motor current further contains a PWM current ripple superimposed onto the fundamental component. The frequency of the ripple is around 3 kHz. The PWM current ripple is undesirable, in that it introduces additional losses and acoustical noise in the motor.

Figure 3:
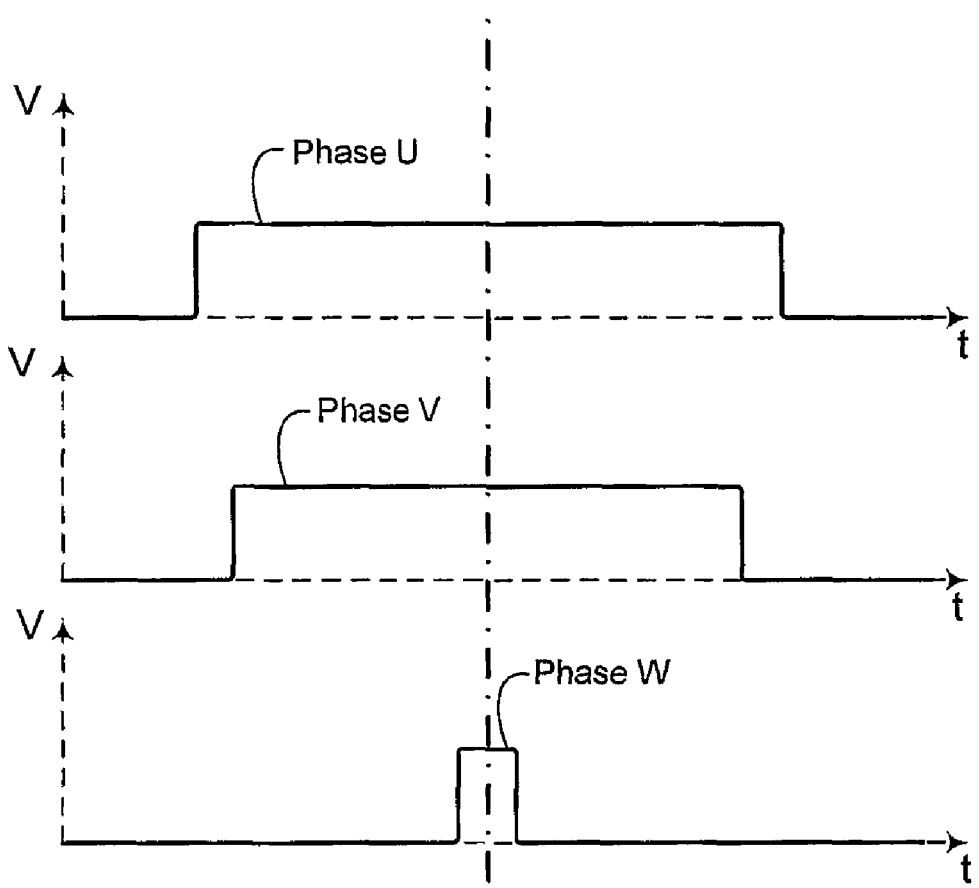
FIG. 3 shows PWM pulses for the three high-side switching elements of a typical three-phase motor controller.

FIG. 3 depicts the PWM pulses for the high side switching elements (T1, T2 and T3) in a three-phase inverter as depicted in FIG. 1. The PWM pulses for phases u, v and w are depicted within a switching period. As seen in FIG. 3, the three PWM pulses are arranged symmetrically around a dashed centre line. This type of arrangement is typical for a three-phase motor controller, and it is often referred to as centre-aligned modulation or double-sided modulation. Regardless of the duty cycle, the symmetry is always maintained.

Figure 4:
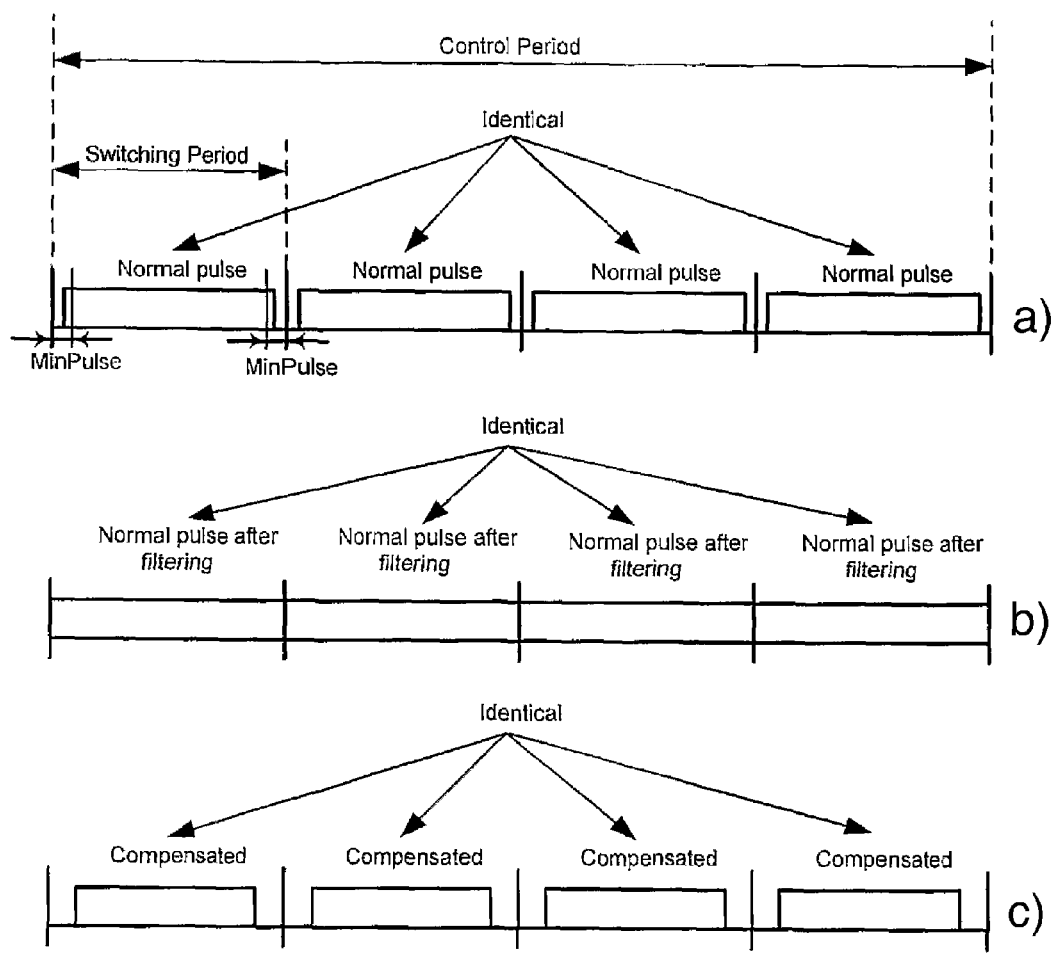
FIG. 4 shows a filtering and correction process according to prior art.

FIG. 4 shows how PWM pulses are generated according to prior art during the need for minimum-pulse filtering. A control period having a corresponding control frequency of for example 4 kHz is divided into four switching periods thereby generating a switching frequency of 16 kHz. The four switching periods of the control period are depicted in FIG. 4a. In addition, PWM pulses in each respective switching period are depicted in FIG. 4a. Since the duty cycle of the PWM pulses of FIG. 4a are too close to unity the PWM pulses are filtered to obtain a duty cycle of unity—see FIG. 4b. In this way a switching element of the inverter is not switched off in a very short time period as the PWM pulses of FIG. 4a else would require. Comparing the PWM pulses of FIG. 4a and FIG. 4b reveals that the duty cycle of the PWM pulses has been increased due to the filtering of the "normal pulses" of FIG. 4a. In order to, in average, obtain a duty cycle as depicted in FIG. 4a the PWM pulses of one or more subsequent control periods need to be reduced, i.e. one has to compensate for the filtered PWM pulses depicted in FIG. 4b. Such compensation is illustrated in FIG. 4c, which shows a subsequent control period to the control period depicted in FIG. 4b. Typically, the control period of FIG. 4c will immediately follow the control period of FIG. 4b so that the average duty cycle of the two control periods of FIGS. 4b and 4c is equivalent to the desired duty cycle depicted in FIG. 4a.

Figure 5:
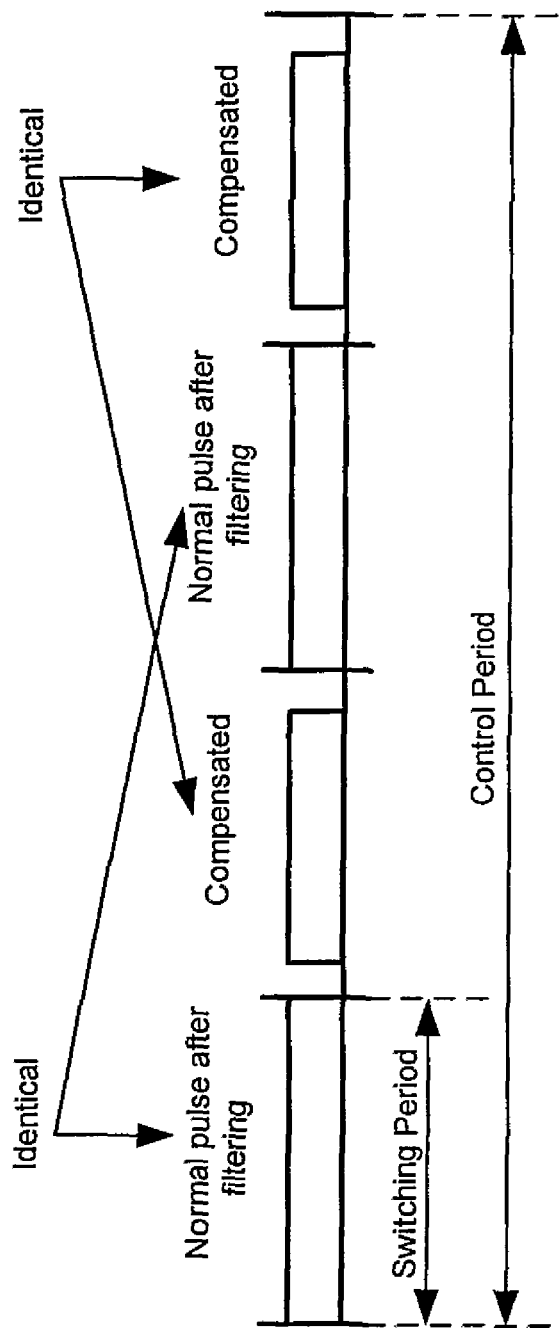
FIG. 5 shows the filtering and correction process according to the present invention.
Figure 6:
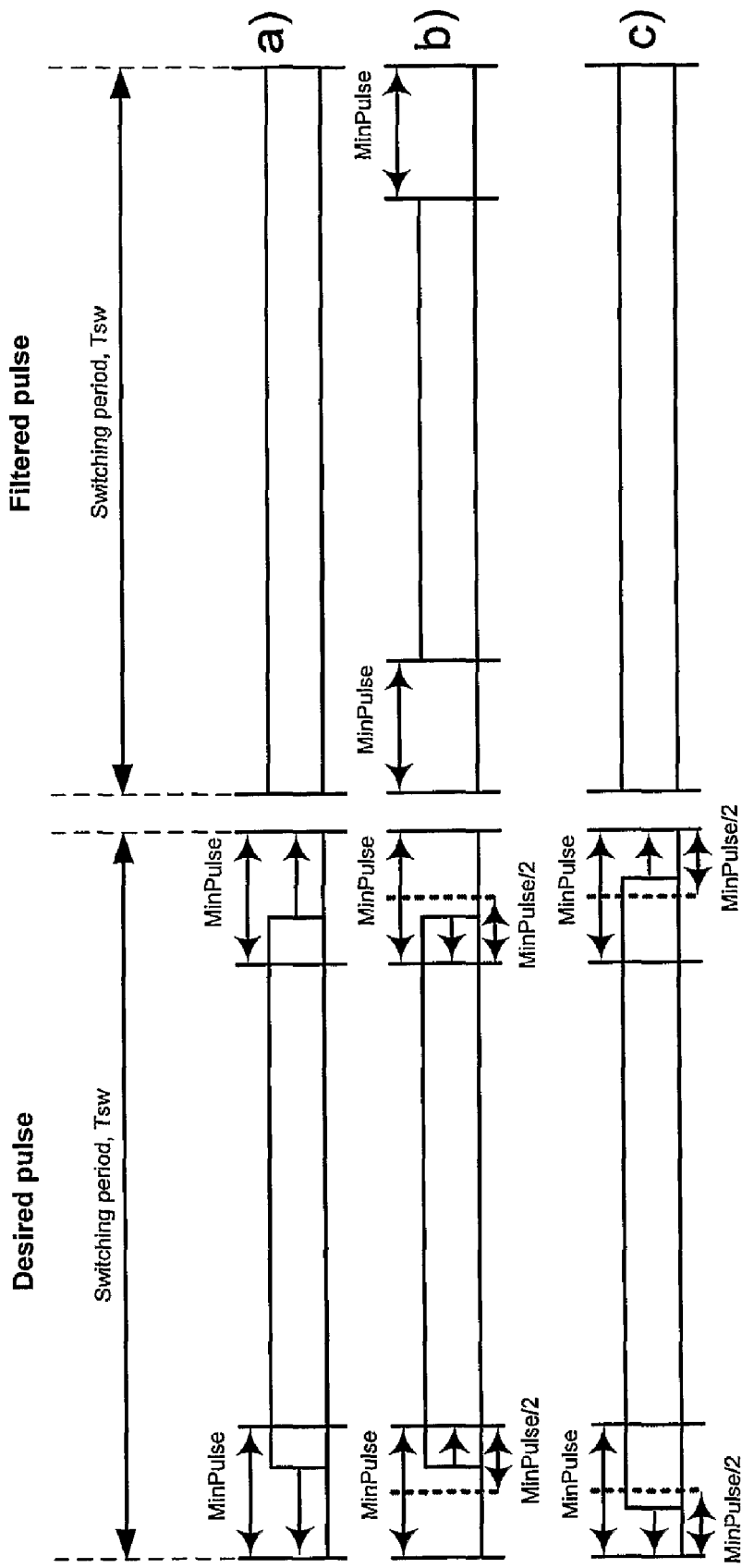
FIG. 6 shows a first example of a comparison between filtering processes.
Figure 7:
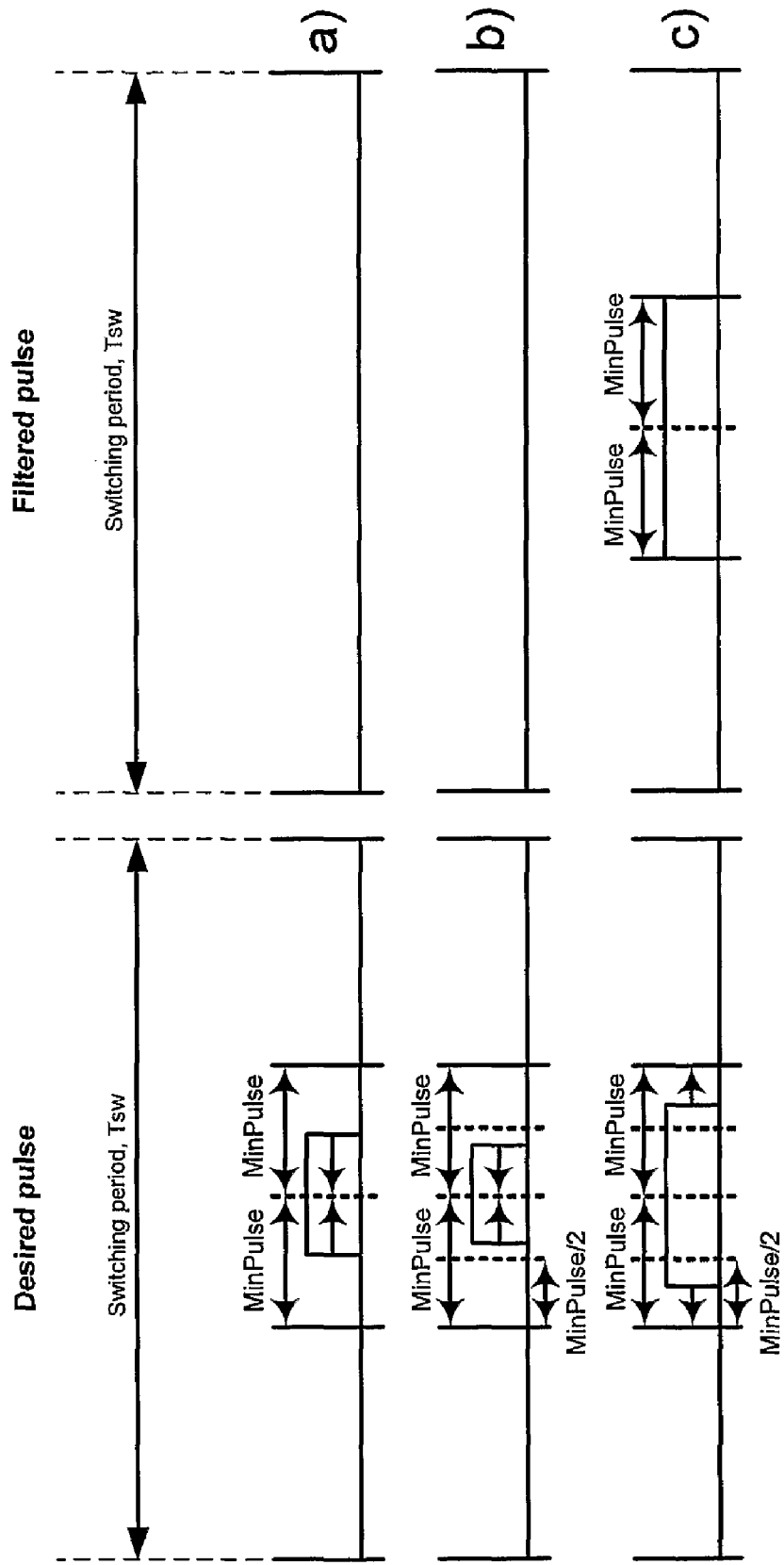
FIG. 7 shows a second example of a comparison between filtering processes.

FIG. 5 shows a control period of a PWM control signal according to the present invention. The control period of FIG. 5 can for example correspond to a 4 kHz control signal, where each control period is divided into four switching periods. As depicted in FIG. 5 compensation for filtered PWM pulses having an increased duty cycle is mainly provided within the same control period, and thus not within a subsequent control period as suggested by prior art methods. Thus, according to the present invention compensation for filtered PWM pulses is provided almost instantaneous.

A simple method for filtering pulses is shown in FIG. 6a and FIG. 7a. The pulse filtering process provided as part of the present invention is depicted in FIG. 6b and FIG. 6c.

FIG. 6a illustrates a pulse filtering process, where the duty cycle is set to unity in the case that the desired pulse exceeds a predetermined percentage of a switching period, Tsw. Thus, if a desired pulse width exceeds Tsw−2×MinPulse the duty cycle is set to unity (see FIG. 6a), whereas in the case that the desired pulse width is smaller than 2×MinPulse, the duty cycle is set to zero (see FIG. 7a).

According to the present invention a modified pulse filtering process is provided. Referring now to FIG. 6c the duty cycle is set to unity in the case that the desired pulse exceeds Tsw−MinPulse. In the case that desired pulse width exceeds Tsw−2×MinPulse, but is smaller than Tsw−MinPulse, the filtered width is set to Tsw−2×MinPulse, FIG. 6b. In the case that the desired pulse width is smaller than MinPulse, the duty cycle is set to zero, see FIG. 7b, whereas in the case that the desired pulse width exceeds MinPulse, but is smaller than 2×MinPulse, the filtered width is set to 2×MinPulse (see FIG. 7c).

Figure 8:
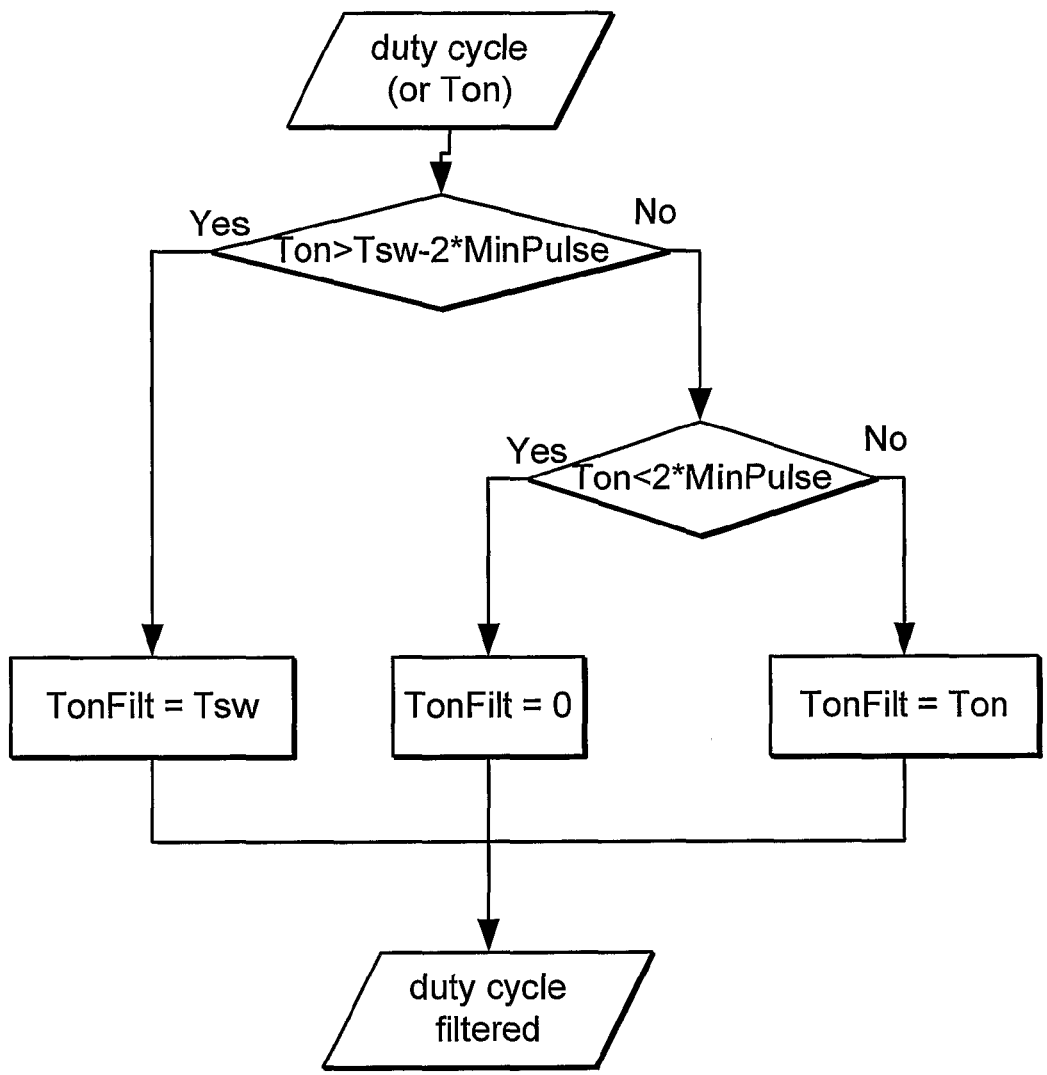
FIG. 8 shows a flow chart of a simple filtering process.
Figure 9:
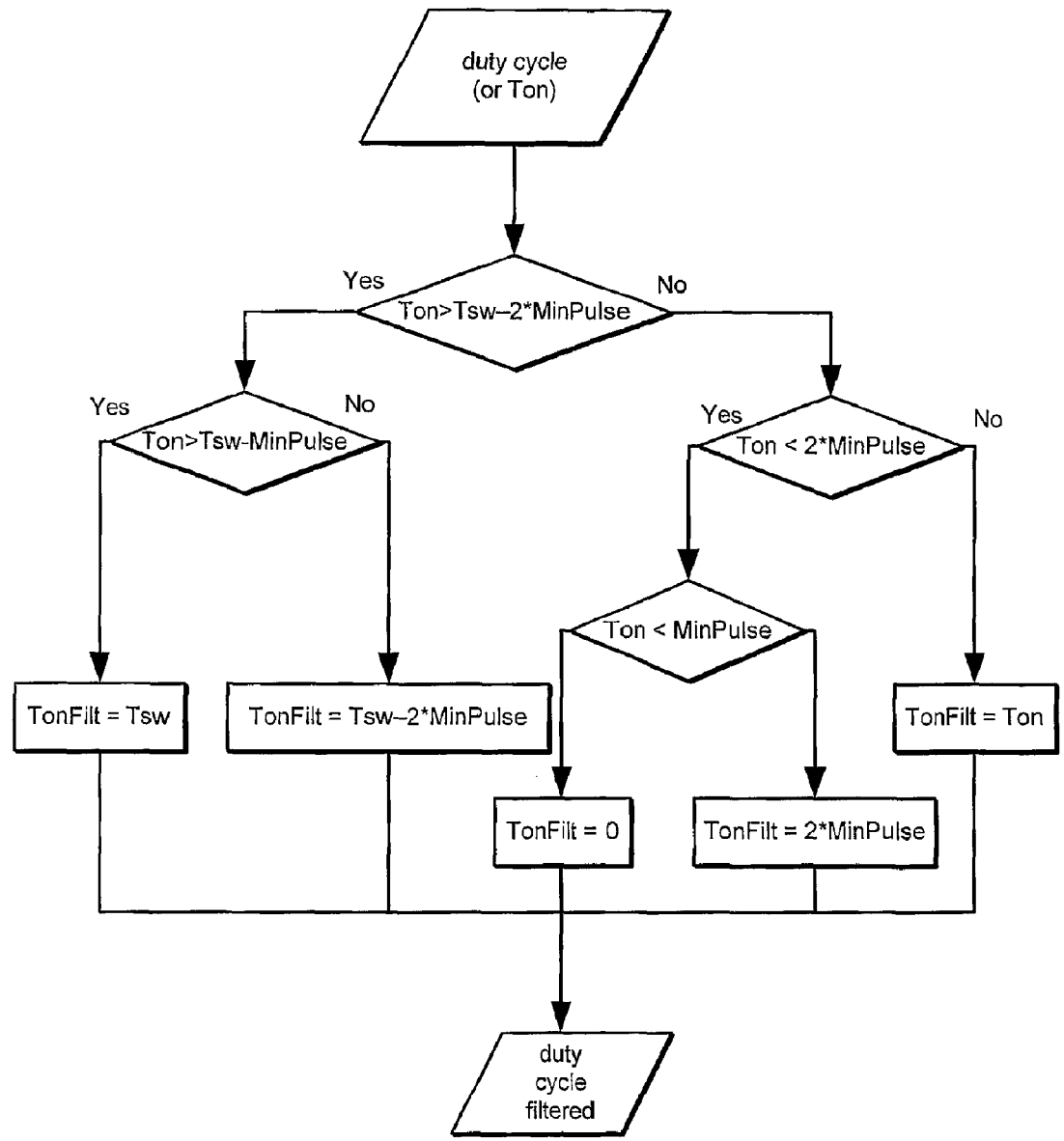
FIG. 9 shows a flow chart of an advanced filtering process.

The simple pulse filtering processes depicted in FIG. 6a and FIG. 7a are illustrated in the flow chart shown in FIG. 8, where Ton denote the on-time of the initial pulse, Tsw is the switching period, MinPulse is a lower threshold of a pulse and TonFilt is the on-time of a filtered PWM pulse. The advanced pulse filtering processes provided as part of the present invention are depicted in FIGS. 6b-c and FIGS. 7b-c, and a corresponding flow chart is shown in FIG. 9.

Figure 10:
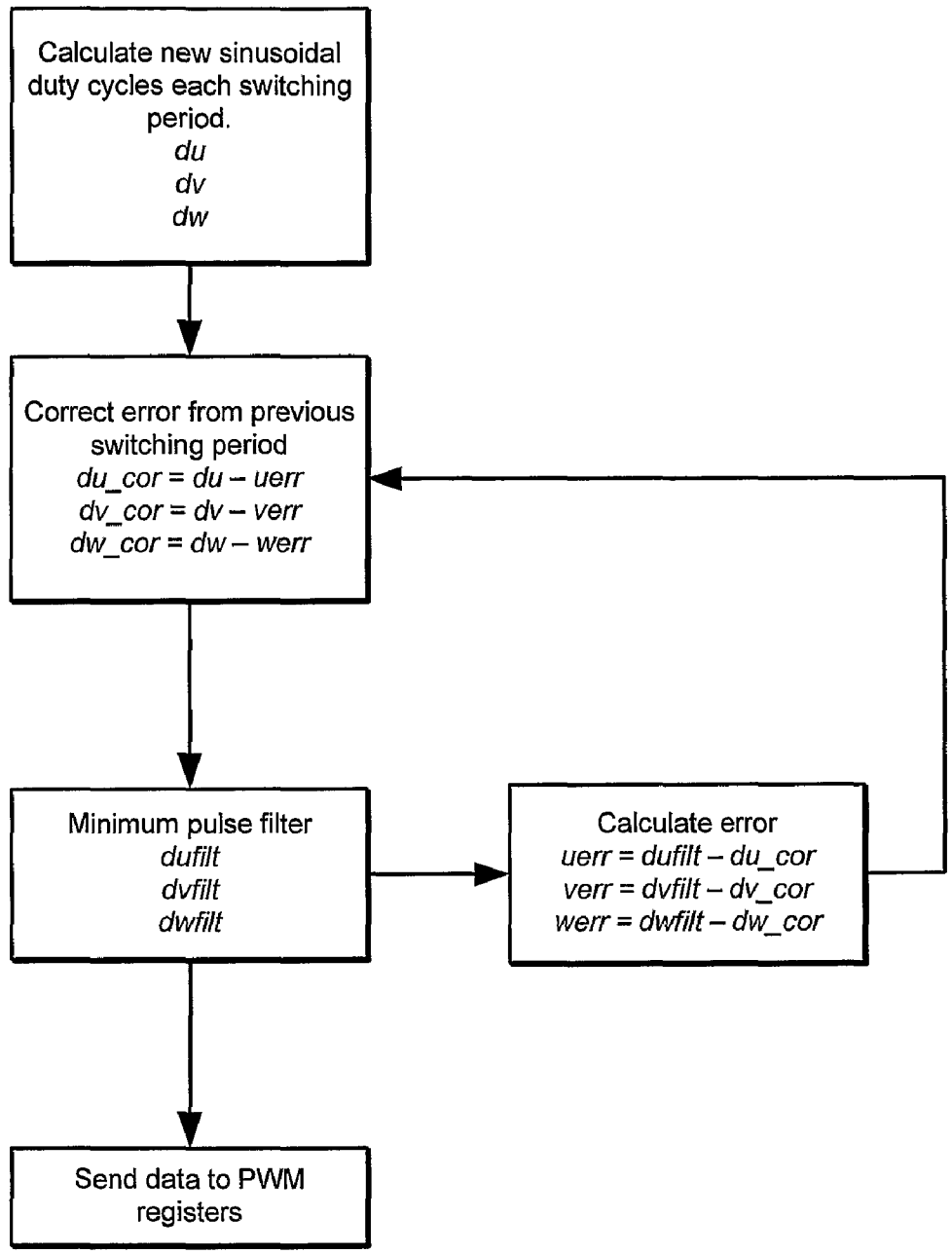
FIG. 10 shows a flow chart of a known filtering and correction process.
Figure 11:
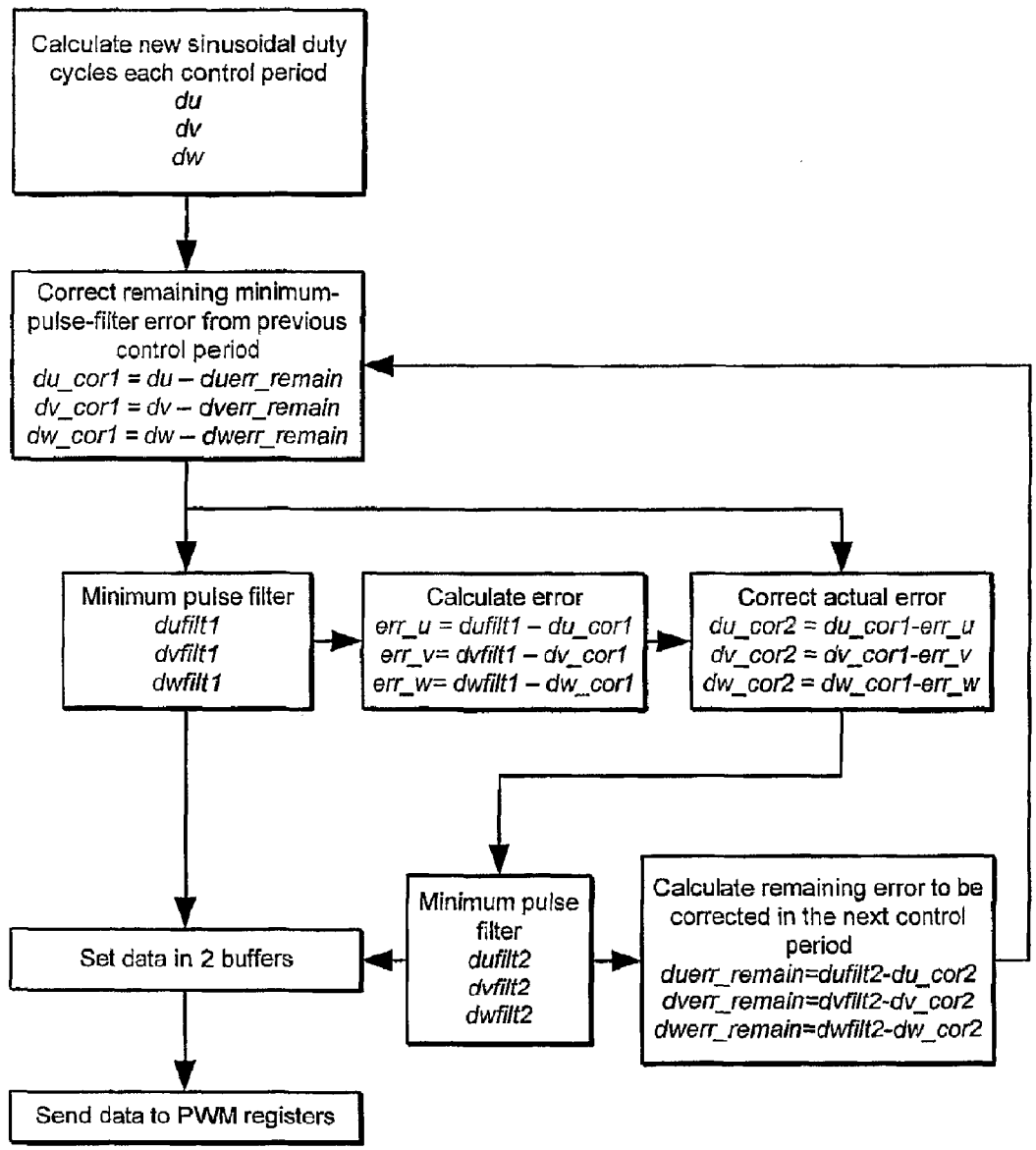
FIG. 11 shows a flow chart of the filtering and correction process according to the present invention.

The flow charts of FIG. 10 and FIG. 11 depict the filtering process and correction process without reuse of pulses and the filtering process and correction process forming part of the present invention, respectively. Referring now to FIG. 10 a traditional PWM calculation and filtering method without reuse of pulses is depicted.

As depicted in FIG. 10 duty cycles du, dv and dw are calculated for phases u, v and w. Before filtering, these duty cycles are corrected for errors du_err, dv_err and dw_err introduced in the previous switching period. The corrected duty cycles du_cor, dv_cor and dw_cor are then passed to the minimum pulse filter, resulting in the filtered duty cycles dufilt, dvfilt and dwfilt. The difference between the filtered duty cycles dufilt, dvfilt and dwfilt and the corrected duty cycles du_cor, dv_cor and dw_cor are the calculated and form the error values du_err, dv_err and dw_err which will be used in correcting the duty cycles in the next switching period. The filtered duty cycles dufilt, dvfilt and dwfilt are sent to the PWM registers.

Referring now to FIG. 11 duty cycles du, dv and dw are again calculated for phases u, v and w. Before filtering, these duty cycles are corrected for remaining errors duerr_remain, dverr_remain and dwerr_remain not corrected for in a previous switching period. The corrected duty cycles du_cor1, dv_cor1 and dw_cor1 are then passed to the minimum pulse filter, resulting in the filtered duty cycles dufilt1, dvfilt1 and dwfilt1 which are sent to a first buffer.

Still referring to FIG. 11 differences between the filtered duty cycles dufilt1, dvfilt1 and dwfilt1 and the corrected duty cycles du_cor1, dv_cor1 and dw_cor1 are calculated in order to derive error values err_u, err_v and err_w. Theses error values are subtracted from corrected duty cycles du_cor1, dv_cor1 and dw_cor1 to form corrected duty cycles du_cor2, dv_cor2 and dw_cor2, the latter being passed to the minimum pulse filter, resulting in the filtered duty cycles dufilt2, dvfilt2 and dwfilt2. The filtered duty cycles dufilt2, dvfilt2 and dwfilt2 are sent to a second buffer.

The filtered duty cycles dufilt1, dvfilt1 and dwfilt1, and dufilt2, dvfilt2 and dwfilt2 are sent from the two buffers to the PWM register. As depicted in FIG. 11, the remaining errors duerr_remain, dverr_remain and dwerr_remain are calculated by subtracting the corrected duty cycle du_cor2, dv_cor2 and dw_cor2 from the filtered duty cycles dufilt2, dvfilt2 and dwfilt2. The remaining errors duerr_remain, dverr_remain and dwerr_remain will be used in correcting the duty cycles in the next control period.

While the invention is susceptible to various modifications and alternative forms, specific embodiments have been shown by way of example in the drawings and will be described in details herein. It should be understood, however, that the invention is not intended to be limited to the particular forms disclosed. Rather, the invention is to cover all modifications, equivalents, and alternatives falling within the spirit and scope of the invention as defined by the appended claims.

The invention claimed is:

1. A method for generating an electric control signal for controlling one or more switching elements of an inverter for driving an electric machine, the method comprising the steps of
providing an electric control signal comprising a control frequency and a corresponding control period,
dividing a first control period of said electric control signal into a plurality of switching periods, and
providing a first switching PWM pulse within a first switching period of a first control period, and providing a second switching PWM pulse within a second switching period of said first control period, wherein the first switching PWM pulse is a minimum-filtered PWM pulse, and wherein the second switching PWM pulse is a corrected PWM pulse.

2. The method according to claim 1, wherein a duty cycle of the first switching PWM pulse is different from a duty cycle of the second switching PWM pulse.

3. The method according to claim 2, wherein the second switching period immediately follows the first switching period.

4. The method according to claim 1, wherein a duty cycle of the minimum-filtered PWM pulse equals
a) unity if a desired pulse width exceeds Tsw−MinPulse, or
b) Tsw−2×MinPulse if a desired pulse width exceeds Tsw−2×MinPulse, but is smaller than Tsw−MinPulse, or
c) zero if a desired pulse width is smaller than MinPulse, or
d) 2×MinPulse if a desired pulse width exceeds MinPulse, but is smaller than 2×MinPulse
wherein Tsw is the switching period within which the minimum-filtered PWM pulse is provided, and wherein MinPulse is a predetermined time interval.

5. The method according to claim 2, wherein the first switching period immediately follows the second switching period.

6. The method according to claim 2, further comprising a step of providing a third switching PWM pulse within a third switching period of said first control period.

7. The method according to claim 6, wherein the third switching PWM pulse is a minimum-filtered PWM pulse having a duty cycle essentially equal to the duty cycle of the first switching PWM pulse.

8. The method according to claim 6, wherein the third switching PWM pulse is a corrected PWM pulse having a duty cycle essentially equal to the duty cycle of the second switching PWM pulse.

9. The method according to claim 6, wherein the third switching period immediately follows the second switching period.

10. The method according to claim 6, further comprising a step of providing a fourth switching PWM pulse within a fourth switching period of said first control period.

11. The method according to claim 10, wherein the fourth switching PWM pulse is a minimum-filtered PWM pulse having a duty cycle essentially equal to the duty cycle of the first switching PWM pulse.

12. The method according to claim 10, wherein the fourth switching PWM pulse is a corrected PWM pulse having a duty cycle essentially equal to the duty cycle of the second switching PWM pulse.

13. The method according to claim 10, wherein the fourth switching period immediately follows the third switching period.

14. The method according to claim 1, further comprising a step of providing a switching PWM pulse within a switching period of a subsequent control period to the first control period, wherein said switching PWM pulse is a corrected PWM pulse provided for correction of at least part of an error not corrected for during the first control period.

15. The method according to claim 14, wherein the subsequent control period immediately follows the first control period.

16. The method according to claim 1, wherein the frequency of the first control period and the subsequent control period is within the range 1-10 kHz, such as within the range 2-8 kHz, such as within the range 3-6 kHz, such as approximately 4 kHz.

17. A system for generating an electric control signal for controlling one or more switching elements of an inverter for driving an electric machine, the system comprising
means for providing an electric control signal comprising a control frequency and a corresponding control period,
means for dividing a first control period of said electric control signal into a plurality of switching periods, and
means for providing a first switching PWM pulse within a first switching period of said first control period, and means for providing a second switching PWM pulse within a second switching period of said first control period, wherein the first switching PWM pulse is a minimum-filtered PWM pulse, and wherein the second switching PWM pulse is a corrected PWM pulse.

18. The system according to claim 17, wherein a first buffer is adapted to provide the minimum-filtered PWM pulse, and wherein a second buffer is adapted to provide the corrected PWM pulse.

19. An inverter for driving an electric machine, the inverter comprising
one or more controllable switching elements, each of said one or more controllable switching elements being controllable by an electric control signal,
means for providing the electric control signal, said electric control signal comprising a control frequency and a corresponding control period,
means for dividing a first control period of said electric control signal into a plurality of switching periods, and
means for providing a first switching PWM pulse within a first switching period of said first control period, and means for providing a second switching PWM pulse within a second switching period of said first control period, wherein the first switching PWM pulse is a minimum-filtered PWM pulse, and wherein the second switching PWM pulse is a corrected PWM pulse.

* * * * *